United States Patent
Campbell

(10) Patent No.: US 6,612,632 B2
(45) Date of Patent: Sep. 2, 2003

(54) CHILD'S HANDHELD DIGGING IMPLEMENT

(76) Inventor: Michael Campbell, 320 Beaver St., Ottsville, PA (US) 18942

(*) Notice: Subject to any disclaimer, the term of this patent is extended or adjusted under 35 U.S.C. 154(b) by 0 days.

(21) Appl. No.: 10/038,359

(22) Filed: Jan. 7, 2002

(65) Prior Publication Data

US 2003/0127871 A1 Jul. 10, 2003

(51) Int. Cl.[7] ................................................ A01B 1/02
(52) U.S. Cl. ........................ 294/55; 294/25; D21/472
(58) Field of Search .......................... 294/1.3, 25, 49, 294/50.6, 50.8, 54.5, 55–60, 68.23, 131; 2/16, 20, 159, 161.6; 15/236.01, 236.02, 236.08, 257.1; 56/400.01, 400.04, 400.11, 400.12; 172/371; 220/737, 771; 224/218; 446/26, 70, 424–426; D8/1, 3, 7, 10, 13; D21/472, 532

(56) References Cited

U.S. PATENT DOCUMENTS

| | | | | |
|---|---|---|---|---|
| 146,172 A | * | 1/1874 | Dodge et al. ................. | 294/55 |
| 567,087 A | * | 9/1896 | Fitzgerald et al. ......... | 294/25 X |
| 2,244,072 A | * | 6/1941 | Ledbetter ..................... | 294/25 |
| D163,115 S | * | 5/1951 | Gordineer ................. | D21/472 |
| 2,782,554 A | * | 2/1957 | Muller ................... | 294/68.23 X |
| 3,407,927 A | * | 10/1968 | Jones ........................ | 294/25 X |
| D232,855 S | * | 9/1974 | Vennola ..................... | D21/472 |
| 3,837,696 A | * | 9/1974 | Dahlke ....................... | 294/25 X |
| 4,378,670 A | * | 4/1983 | Check et al. ............. | 294/55 X |
| 4,907,356 A | * | 3/1990 | Labounty ................. | 294/68.23 |
| 5,024,397 A | * | 6/1991 | Edwards et al. ......... | 294/68.23 |
| 5,169,191 A | * | 12/1992 | Benz ..................... | 294/50.8 X |
| 5,359,840 A | * | 11/1994 | Costar .................... | 294/50.8 X |
| 5,671,864 A | * | 9/1997 | Caruthers .................... | 220/737 |
| D395,928 S | * | 7/1998 | Freelander ................. | D21/472 |

FOREIGN PATENT DOCUMENTS

| | | | | |
|---|---|---|---|---|
| DE | 501202 | * | 7/1930 | ................... 294/55 |

* cited by examiner

*Primary Examiner*—Christopher P. Ellis
*Assistant Examiner*—Paul T. Chin
(74) *Attorney, Agent, or Firm*—LaMorte & Associates

(57) ABSTRACT

A toy digging implement that is worn over the hand of a child. The digging implement simulates the appearance of a backhoe bucket. The digging implement has a set of parallel side walls. A first curved structure is disposed between the side walls defining an open bucket scoop. A second curved structure is disposed between the side walls behind the first curved structure. The second curved structure diverges from the first curved structure near the front of the digging implement. Consequently, the first curved structure, the second curved structure and the side walls define a pocket having an open end at the rear of the digging implement. A child places his/her hand into the pocket to engage the digging implement. The digging implement protects the child's hand and enables the child's hand to simulate the appearance and function of a backhoe bucket.

8 Claims, 2 Drawing Sheets

CHILD'S HANDHELD DIGGING IMPLEMENT

BACKGROUND OF THE INVENTION

1. Field of the Invention

The present invention relates to handheld digging implements that are used to dig holes and otherwise manipulate dirt, sand and other types of loose soil. More particularly, the present invention relates to digging implements for use by children, wherein the digging implement has play value.

2. Prior Art Statement

The prior art is replete with different types of digging implements. Most of these digging implements are tools that are intended to make the task of digging more efficient and less labor intensive. However, there are a small number of digging implements that are designed for use by children. With such digging implements, the concerns of safety and play value outweigh the efficiency of the implement as a digging tool.

Children typically like to dig. Sandboxes are very popular play centers in many private backyards and public playgrounds. Recognizing the need, toy manufacturers produce many toys that are designed for use in sandboxes, wherein the toy is used to dig or otherwise manipulate sand, dirt gravel and other types of loose soil. For example, children often play with toy buckets and small plastic shovels. Such digging implements are designed to be small and lightweight so that they can be manipulated by the limited strength of a child. Consequently, such digging implements are not particularly efficient at digging, they just are fun to play with in sand or loose soil.

Children, however, tend to be fascinated by real tools that are designed to dig. Many children are particularly fond of large construction equipment such as dump trucks, bulldozers, backhoes and other pieces of equipment that are used at a construction site to dig and move earth. As a result, many toys have been invented that simulate real construction equipment. For example, toy dump trucks are commonly used in sandboxes. Miniaturized backhoes, cranes, bulldozers and other construction trucks are also very popular toys. However, miniaturized construction trucks can only move a small amount of sand and therefore have limited play value in a sandbox, at the beach, or other locations where digging is the play activity at hand.

Toy manufacturers have built larger toy trucks and play digging equipment for use by children. However, such toys have an inherent design problem. If a toy simulates the workings of a backhoe, crane, bulldozer or the like, the toy must have exposed moving parts. As the exposed parts move, the toy produces the danger that a child's fingers, hair, clothing or the like may get caught in the moving parts. Although the potential for physical danger is small, children can pinch a finger with enough force to cause the child to experience pain and begin to cry. For example, a dump truck, by definition, must have a truck bed that rises and dumps. If a child places his/her hand under the truck bed when it is open, that child's hand can be pinched when the truck bed is closed. Backhoes have multiple linkages that are connected at pivot points. It is very easy for a child to pinch a finger between these linkages as they move. The tendency of a child to hurt himself/herself on the moving parts of a digging toy is inversely proportional to the age of the child. Accordingly, more complex digging toys, such as simulated backhoes, are marketed to older children. However, it is the younger children who more enjoy playing in sandboxes. Consequently, children who are younger than the age recommended by the manufacturer, commonly use such toys.

A need therefore exists for a toy configuration that enables a child to simulate the workings of a backhoe or digging crane without presenting exposed moving parts to the child. As a result, any danger of harm to the child from the moving parts is eliminated. This need is met by the present invention as described and claimed below.

SUMMARY OF THE INVENTION

The present invention is a toy digging implement that is worn over the hand of a child. The digging implement simulates the appearance of a backhoe bucket. The digging implement has a set of parallel side walls. A first curved structure is disposed between said side walls defining an open bucket scoop. A second curved structure is disposed between the side walls behind the first curved structure. The second curved structure diverges from the first curved structure near the front of the digging implement. Consequently, the first curved structure, the second curved structure and the side walls define a pocket having an open end at the rear of the digging implement. A child places his/her hand into the pocket to engage the digging implement. The digging implement protects the child's hand and enables the child's hand to simulate the appearance and function of a backhoe bucket. The child's arm is used to simulate the function of the backhoe that moves the bucket.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
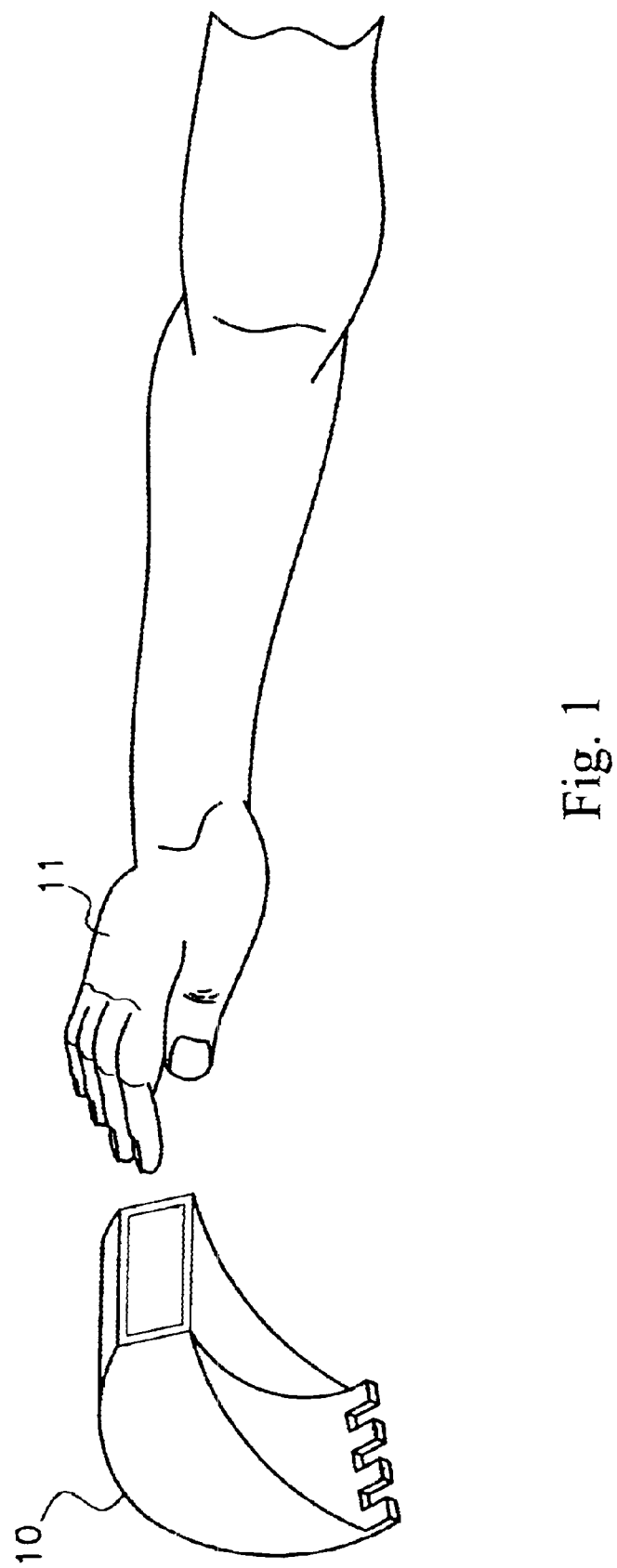
FIG. 1 is a perspective view of an exemplary embodiment of the present invention digging implement shown in conjunction with a child's arm.

Referring to FIG. 1, an exemplary embodiment of the present invention digging implement 10 is shown. The digging implement 10 is shaped like the bucket termination of a backhoe. However, the digging implement 10 is specifically designed to internally receive a child's hand 11. As such, the digging implement 10 is worn over the child's hand 11 like a glove.

Once a child's hand 11 is placed into the digging implement 10, the digging implement 10 is carried by that child's hand at the end of that child's arm. The child's hand 11, therefore, has the appearance of a backhoe bucket. The child's arm can then be used in the same manner as the arm of a backhoe, wherein the child's upper arm and forearm serve as the linkages of the backhoe, and the digging implement worn on the hand serves as the bucket of the backhoe. The range of movement of an arm is very similar to the range of movement of a backhoe arm. Consequently, a child can closely simulate the form and function of a backhoe without any moving mechanical parts.

Figure 2:
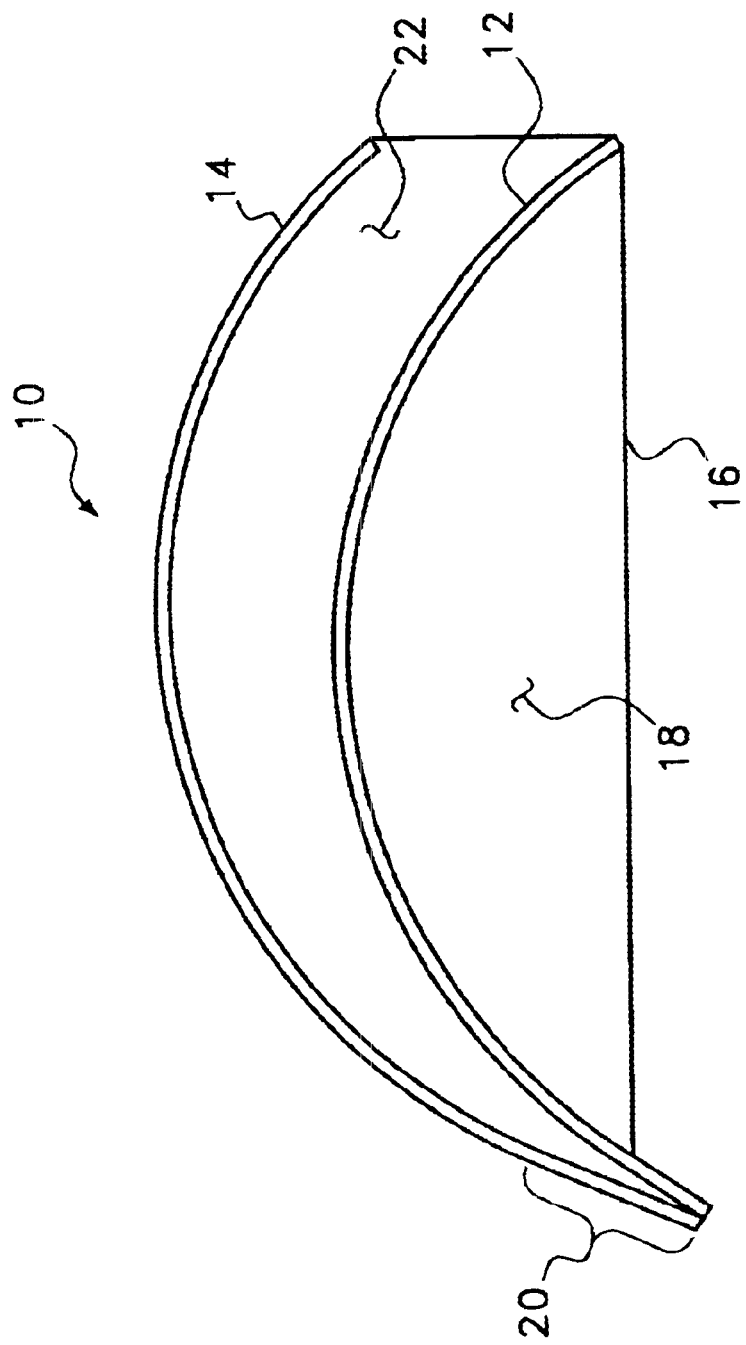
FIG. 2 is a cross-sectional view of the embodiment of the digging implement shown in FIG. 1.

Referring to FIG. 2, it can be seen that the digging implement 10 has two internal curved structures 12, 14 that are disposed between two parallel side walls 16. The first curved structure 12 combines with the side walls 16 to create the bucket chamber 18 of the digging implement 10. It is the bucket chamber 18 that carries sand, soil or the like when the digging implement 10 is used to dig. The volume of the bucket chamber 10 can vary between ½ cup to 4 cups depending upon the size of the digging implement 10. Smaller digging implements 10 are marketed to younger children, so they can physically handle the weight of a full bucket chamber 18.

The second curved structure 14 intersects the first curved structure 12 near the front end of the digging implement 10, thereby creating a double layered area 20. The double layered area 20 of both the first curved structure 12 and the second curved structure 14 at the front end of the digging implement 10 provides that area with a great deal of strength. This added strength from the reinforcement is needed, since it is the double layered area 20 that experiences the majority of stresses as the digging implement 10 is used to dig. To better have the digging implement 10 mimic the appearance of a real backhoe bucket, the very front end of the first curved structure 12 and/or the second curved structure 14 can be serrated to have the classic dovetail appearance of a real backhoe bucket.

As the first curve structure 12 and the second curved structure 14 extend away from the front end of the digging implement 10, the two structures diverge. The divergence between the first curved structure 12 and the second curved structure 14 creates a pocket 22 within the digging implement 10. This pocket 22 has an open end at the back end of the digging implement 10. When a child places his/her hand into the digging implement 10, the child's hand extends through the open end and into the pocket 22. Depending upon the size of the digging implement 10, the size of the child's hand and/or the preference of the child, all five fingers of the hand can be advanced into the pocket 22, or the thumb can be left outside of the pocket 22.

Since the pocket 22 for the child's hand is made from the space between the first curved structure 12 and the second curved structure 14, the space defined by the pocket 22 is also curved. This causes a child's hand to curve with the pocket 22 as the child's hand is placed into the pocket 22. The curved position of the hand enables a child to physically grab the top of the first curved structure 12 with his/her hand. It also enables the top of the child's hand to engage the bottom of the second curved structure 14. This enables a child's hand to firmly engage the digging implement 10 as they dig, yet enables the child to release the digging implement 10 with a minimum of effort.

Since the child's hand is confined within the pocket 22 when digging with the digging implement 10, the child's hand is protected from contacting the sand or soil being dug. A child's hand will therefore be kept relatively clean even though they are digging in dirt. This is particularly true of the child's fingernails that are completely protected from dirt during the digging process. The presence of the hand in the pocket 22 of the digging implement 10 also prevents the child's hand from being rubbed against the sand when digging at the beach or in a sandbox. This protects the skin from sand chaffing.

The present invention digging implement 10 can be made of metal. However, to prevent problems concerning rust, tetanus and product safety, the digging device is preferably molded from plastic and does not have sharp edges.

It will be understood that the present invention digging implement described and illustrated is merely an exemplary embodiment and that a person skilled in the art can make many variations to the shown design. For example, the size and volume of the bucket space can be varied. The appearance of the side walls and serrated front end can also be changed as desired. All such modifications and alternate embodiments are intended to be included within the scope of the present invention as described and claimed below.

What is claimed is:

1. A child's digging implement, comprising:

two parallel side walls;

a first curved structure extending between said side walls defining an open bucket scoop having a front end and a back end;

a second curved structure extending between said side walls, said second curved structure laying in abutment with said first curved structure near said front end of said bucket scoop, creating a double layered area at said front end of said bucket scoop, wherein said second curved structure diverges from said first curved structure past said double layered area forming a pocket between said first curved structure and said second curved structure having an open end proximate said rear end of said bucket scoop into which a child's hand with all five fingers can be placed.

2. The implement according to claim 1, wherein said pocket is sized to receive a child's hand therein.

3. The implement according to claim 1, wherein said bucket scoop has a volume between one half cup and four cups.

4. The implement according to claim 1, wherein said first end of said bucket scoop defines serrations.

5. A digging implement worn on the hand, comprising:

an open bucket scoop having side walls and a curved bottom surface, said bucket scoop having a front end and a rear end;

a curved structure disposed behind said bottom surface, said curved structure abutting against said bottom surface proximate said front end, creating a doubled layer section, wherein said curved structure diverges from said bottom surface past said double layered section and defines a pocket behind said bottom surface having one open end for receiving a person's hand therein.

6. The digging implement according to claim 5, wherein said pocket is defined by said bottom surface of said bucket scoop, a curved structure diverging from said bottom surface and said side walls.

7. The implement according to claim 5, wherein said bucket scoop has a volume between one half cup and four cups.

8. The implement according to claim 5, wherein said bucket scoop has serrations at said front end.

\* \* \* \* \*